US012771603B2

(12) United States Patent
Dankner et al.

(10) Patent No.: US 12,771,603 B2
(45) **Date of Patent: *Oct. 20, 2026**

(54) COMPUTING INTERFACE NETWORK CONFIGURATION GRAPHS AND TECHNIQUES FOR SECURING COMPUTING ENVIRONMENTS THEREWITH

(71) Applicant: Noname Gate Ltd., Cambridge, MA (US)

(72) Inventors: Dor Dankner, Tel Aviv (IL); Tomer Semo, Tel Aviv-Jaffa (IL); Aner Morag, Tel Aviv (IL); Shay Levi, Tel Aviv (IL); Oz Golan, Ramat Gan (IL); Oren Shpigel, Tel Aviv (IL); Hila Zigman, Hod Hasharon (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/903,102

(22) Filed: Oct. 1, 2024

(65) Prior Publication Data

US 2025/0132980 A1 Apr. 24, 2025

Related U.S. Application Data

(63) Continuation of application No. 18/055,218, filed on Nov. 14, 2022, now Pat. No. 12,107,732.

(51) Int. Cl.

| | |
|---|---|
| ***H04L 41/0869*** | (2022.01) |
| ***H04L 41/0816*** | (2022.01) |
| ***H04L 41/0873*** | (2022.01) |

(52) U.S. Cl.

CPC ...... *H04L 41/0869* (2013.01); *H04L 41/0816* (2013.01); *H04L 41/0873* (2013.01)

(58) Field of Classification Search

CPC ............. H04L 41/0869; H04L 41/0816; H04L 41/0873; H04L 41/40; H04L 41/085; H04L 41/12

See application file for complete search history.

(56) References Cited

U.S. PATENT DOCUMENTS 10,992,543 B1 * 4/2021 Rachamadugu ...... H04L 41/145
11,722,554 B2 * 8/2023 Keren ..................... H04L 41/14 709/223

(Continued)

FOREIGN PATENT DOCUMENTS

CN 1610323 A * 4/2005 ........... H04L 67/303
CN 107248007 A * 10/2017 ............ G06Q 10/04

(Continued)

*Primary Examiner* — Richard G Keehn
(74) *Attorney, Agent, or Firm* — David H. Judson

(57) ABSTRACT

A system and method for securing a computing environment using graphing of computing interfaces. A method includes traversing a network configuration graph with respect to a first component deployed in a computing environment. Traversing the network configuration graph results in a connections between components in the computing environment represented by nodes including at least one connection to a first node representing the first component. The nodes include at least one computing interface node and at least one other node. Each computing interface node represents a computing interface of computing interfaces deployed in the computing environment. The method also includes determining, based on the connections, a configuration of the first component with respect to service or consumption of at least one of the computing interfaces. The method also includes detecting a misconfiguration of the first component based on the determined configuration of the first component.

9 Claims, 5 Drawing Sheets

(56) References Cited

U.S. PATENT DOCUMENTS

| | | | | | |
|---|---|---|---|---|---|
| 11,775,992 | B1 * | 10/2023 | Sullivan | G06Q 30/0202 | 705/7.31 |
| 2013/0290520 | A1 * | 10/2013 | Noo | H04L 41/12 | 709/224 |
| 2015/0139038 | A1 * | 5/2015 | Riederer | H04L 41/12 | 370/256 |
| 2015/0358391 | A1 * | 12/2015 | Moon | G06F 11/3409 | 709/224 |
| 2021/0320945 | A1 * | 10/2021 | Black | H04L 43/106 | |
| 2022/0360509 | A1 * | 11/2022 | Gao | H04L 43/12 | |

FOREIGN PATENT DOCUMENTS

| | | | | | |
|---|---|---|---|---|---|
| CN | 108632100 | A | * | 10/2018 | H04L 41/0213 |
| JP | 2011203777 | A | * | 10/2011 | |

* cited by examiner

COMPUTING INTERFACE NETWORK CONFIGURATION GRAPHS AND TECHNIQUES FOR SECURING COMPUTING ENVIRONMENTS THEREWITH

BACKGROUND OF THE INVENTION

The present disclosure relates generally to tracing computing interface flows, and more specifically to graphing such flows in order to aid in misconfiguration detection for computing interfaces.

The vast majority of cybersecurity breaches can be traced back to an issue with a computer interface such as an application programming interface (API). API abuses are expected to become the most frequent attack vector in the future, and insecure APIs have been identified as a significant threat to cloud computing.

An API is a computing interface. A computing interface is a shared boundary across which two or more separate components of a computer system exchange information. Computing interfaces therefore allow disparate computing components to effectively communicate with each other despite potential differences in communication format, content, and the like. An API defines interactions between software components.

In modern computing architectures, the backend acts like a direct proxy for data. As a result, a flawed API can lead to exposure of sensitive data, account takeovers, and even denial of service (DOS) attacks. As a result, securing APIs is a top priority of many computing services providers.

Cybersecurity solutions related to APIs face ongoing challenges about identifying misconfigurations of APIs and, more specifically, preemptively identifying potential vulnerabilities in APIs before the API is being exposed to external systems. Identifying how APIs interact with other components in network environments could be useful for identifying potential vulnerabilities in advance, but the challenge of identifying such connections is not trivial.

It would therefore be advantageous to provide a solution that would overcome the challenges noted above.

SUMMARY OF THE INVENTION

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing a computing environment using graphing of computing interfaces. The method comprises: traversing a network configuration graph with respect to a first component deployed in a computing environment, wherein traversing the network configuration graph results in a plurality of connections between a plurality of components in the computing environment represented by a plurality of nodes including at least one connection to a first node representing the first component, wherein the plurality of nodes includes at least one computing interface node and at least one other node, wherein each computing interface node represents a computing interface of a plurality of computing interfaces deployed in the computing environment; determining, based on the plurality of connections, a configuration of the first component with respect to service or consumption of at least one of the plurality of computing interfaces; and detecting a misconfiguration of the first component based on the determined configuration of the first component.

Certain embodiments disclosed herein also include a non-transitory computer readable medium having stored thereon causing a processing circuitry to execute a process, the process comprising: traversing a network configuration graph with respect to a first component deployed in a computing environment, wherein traversing the network configuration graph results in a plurality of connections between a plurality of components in the computing environment represented by a plurality of nodes including at least one connection to a first node representing the first component, wherein the plurality of nodes includes at least one computing interface node and at least one other node, wherein each computing interface node represents a computing interface of a plurality of computing interfaces deployed in the computing environment; determining, based on the plurality of connections, a configuration of the first component with respect to service or consumption of at least one of the plurality of computing interfaces; and detecting a misconfiguration of the first component based on the determined configuration of the first component.

Certain embodiments disclosed herein also include a system for securing a computing environment using graphing of computing interfaces. The system comprises: a processing circuitry; and a memory, the memory containing instructions that, when executed by the processing circuitry, configure the system to: traversing a network configuration graph with respect to a first component deployed in a computing environment, wherein traversing the network configuration graph results in a plurality of connections between a plurality of components in the computing environment represented by a plurality of nodes including at least one connection to a first node representing the first component, wherein the plurality of nodes includes at least one computing interface node and at least one other node, wherein each computing interface node represents a computing interface of a plurality of computing interfaces deployed in the computing environment; determining, based on the plurality of connections, a configuration of the first component with respect to service or consumption of at least one of the plurality of computing interfaces; and detecting a misconfiguration of the first component based on the determined configuration of the first component.

BRIEF DESCRIPTION OF DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION OF THE INVENTION

The various disclosed embodiments include methods and systems for creating network configuration graphs mapping computing interfaces such as application programming interfaces (APIs) and for using such network configuration graphs to secure computing environments. The disclosed embodiments provide techniques which allow for unearthing and leveraging connections between and with APIs in order to improve cybersecurity of deployments involving use of APIs in computing environments.

In an embodiment, a network configuration graph is created by abstracting nodes of a network infrastructure representing components that are related to serving and consuming computing interfaces such as APIs. Metadata related to the service and consumption of computing interfaces as well as other metadata related to interactions between the components is inspected and analyzed in order to identify connections between those components. These connections are mapped and utilized to create a network configuration graph.

The network configuration graph is created such that it can be queried or otherwise traversed with respect to a specific component in order to identify flows involving that component related to the service and/or consumption of computing interfaces. In various embodiments, the network configuration graph is traversed in order to analyze components for potential misconfigurations related to service and consumption of computing interfaces such as, but not limited to, exposure of a computing interface to a component that is not permissible.

In this regard, it is noted that, in modern computing environments, communications which involve APIs at some point in the process usually diverge in a non-linear manner. Additionally, components involved in such communications may serve roles in various layers of an infrastructure. The result of these realities is that accurately identifying connections between such components is hindered by the non-linear and indirect flows of communications. Moreover, even if computing interfaces can be accurately tied to certain portions of data related to communications within the environment, this still does not provide the full context needed to evaluate how those computing interfaces interact with other components, which in turn can be utilized to analyze for misconfigurations of computing interfaces. The disclosed embodiments provide techniques for unearthing connections related to APIs which are obscured by these hidden flows, which in turn allows for better understanding the configurations of network environments and therefore more accurately determining when network environments are misconfigured using rules defined with respect to computing interface communications.

Figure 1:
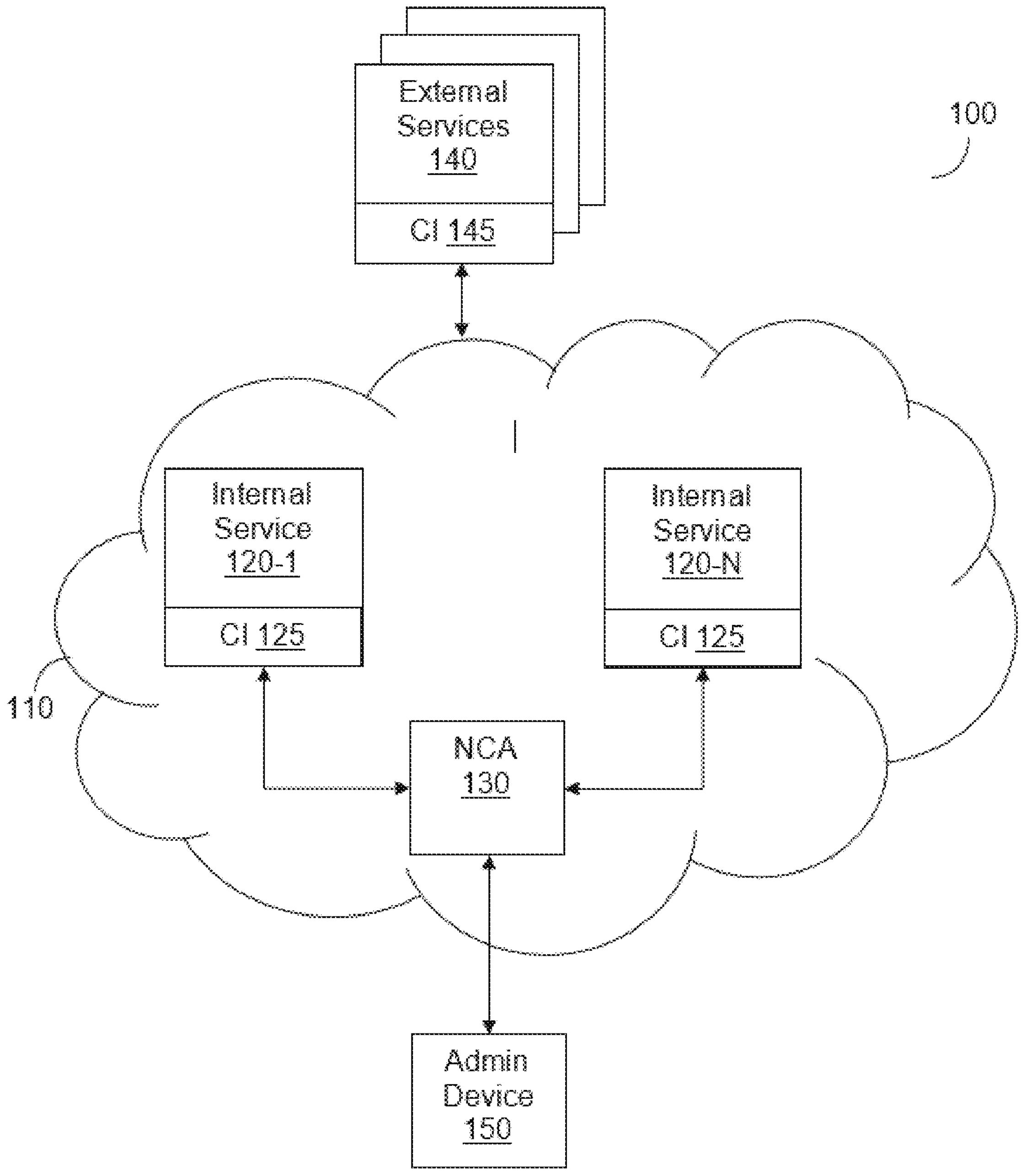
FIG. 1 is a network diagram utilized to describe various disclosed embodiments.

FIG. 1 shows an example network diagram 100 utilized to describe the various disclosed embodiments. In the example network diagram 100, internal services 120-1 through 120-N (which may be referred to individually as an internal service 120 or collectively as internal services 120) communicate with each other and/or with one or more external services 140 (which may be referred to individually as an external service 140 or collectively as external services 140). The internal services 120 are services hosted on a network 110. Each of the internal services 120 communicates at least using a respective communications interface (CI) 125 and each of the external services 140 communicates at least using a respective communications interface (CI) 145. The computing interfaces 125 and 145 may be, but are not limited to, Application Programming Interfaces (APIs).

The network 110 may be, but is not limited to, a wireless, cellular or wired network, a local area network (LAN), a wide area network (WAN), a metro area network (MAN), the Internet, the worldwide web (WWW), similar networks, and any combination thereof. The network 110 may be operated by an organization (e.g., by including servers owned by the organization), or may be operated by another entity (e.g., a cloud provider or other provider of network computing services). It should be noted that a single network 110 is depicted merely for simplicity purposes, but that the internal services 120 may communicate via multiple networks and/or other connections in accordance with the disclosed embodiments.

The network configuration analyzer (NCA) 130 is configured to create and utilize network configuration graphs in accordance with various embodiments described herein. The network configuration graphs include mappings which are at least based on connections between computing interfaces such as the computing interfaces 125 and one or more other components in the computing infrastructure such as the internal services 120 and the external services 140. Processes for utilizing and for creating network configuration graphs which may be performed by the network configuration analyzer 130 are described below with respect to FIGS. 2 and 3, respectively.

To support the network configuration graphs, the network configuration analyzer 130 is configured to abstract nodes of a computing infrastructure (e.g. the infrastructure of the cloud environment depicted in FIG. 1). The nodes represent components which may interact with the computing interfaces either directly or indirectly (e.g., the internal services 120 and/or the external services 140, which may use or otherwise interact with various computing interfaces 125 and/or 145 while communicating with other services and systems), and in accordance with various disclosed embodiments at least include nodes that are related to serving computing interfaces, consuming computing interfaces, or both.

In accordance with various embodiments, the network configuration analyzer 130 is configured to inspect metadata from one or more engines (not shown) related to serving and/or consuming computing interfaces in order to identify logical connections between computing interface-related components that serve, consume, or otherwise interact with computing interfaces. Based on such inspection, the network configuration analyzer 130 is configured to create a mapping between such computing interface-related components. Such a mapping is included in a network configuration graph, which can be subsequently traversed in order to identify connections involving computing interfaces, which in turn can be utilized to identify misconfigurations caused by or related to such connections.

In accordance with various disclosed embodiments and in further support of the network configuration analysis, the network configuration analyzer 130 may be further configured to resolve dependencies of computing interfaces. In some embodiments, the process used for resolving dependencies for a given computing interface 125 depends on the availability of a specification for the computing interface 125. Example processes for resolving dependencies with and without a specification of a computing interface are described in more detail in U.S. patent application Ser. No. 17/661,821, assigned to the common assignee, the contents of which are hereby incorporated by reference. Such duplicated traffic may be analyzed in order to determine how computing interfaces are consumed, which in turn is utilized to determine the mappings involving those computing interfaces.

In some embodiments, the network configuration analyzer 130 may send notifications about, for example, misconfigurations which have been identified as described herein, to an administrator (admin) device 150. The admin device 150 may be, but is not limited to, a personal computer, a laptop, a tablet computer, a smartphone, a wearable computing device, or any other device capable of receiving and displaying notifications or a graphical user interface including anomaly detection data and/or supplemental data. The admin device 150 may be, but is not limited to, operated by an administrator of the network 110 or other user who may want information regarding computing interfaces used within the network (e.g., the computing interfaces 125) and, in particular, vulnerabilities of such computing interfaces. In another implementation (not shown in any of FIGS. 1A-C), the network configuration analyzer 130 may be configured to send such data to a cybersecurity tool configured to perform mitigation actions with respect to the internal services 120 and/or the external service 140.

It should be noted that the particular network configuration shown in FIG. 1 is merely utilized to illustrate an example deployment of the network configuration analyzer 130, and that the disclosed embodiments may be applied to other network configurations without departing from the scope of the disclosure. As some particular examples, different numbers of internal services 120 may communicate within the network 110, and the network configuration analyzer 130 may be configured to detect vulnerabilities related to computing interfaces served or consumed by any or all of them. In some implementations, multiple network configuration analyzers may be utilized. Additionally, the network configuration analyzer 130 may be implemented as a system (e.g., a server), as a virtual machine, as a software container or other self-contained software package, and the like.

Figure 2:
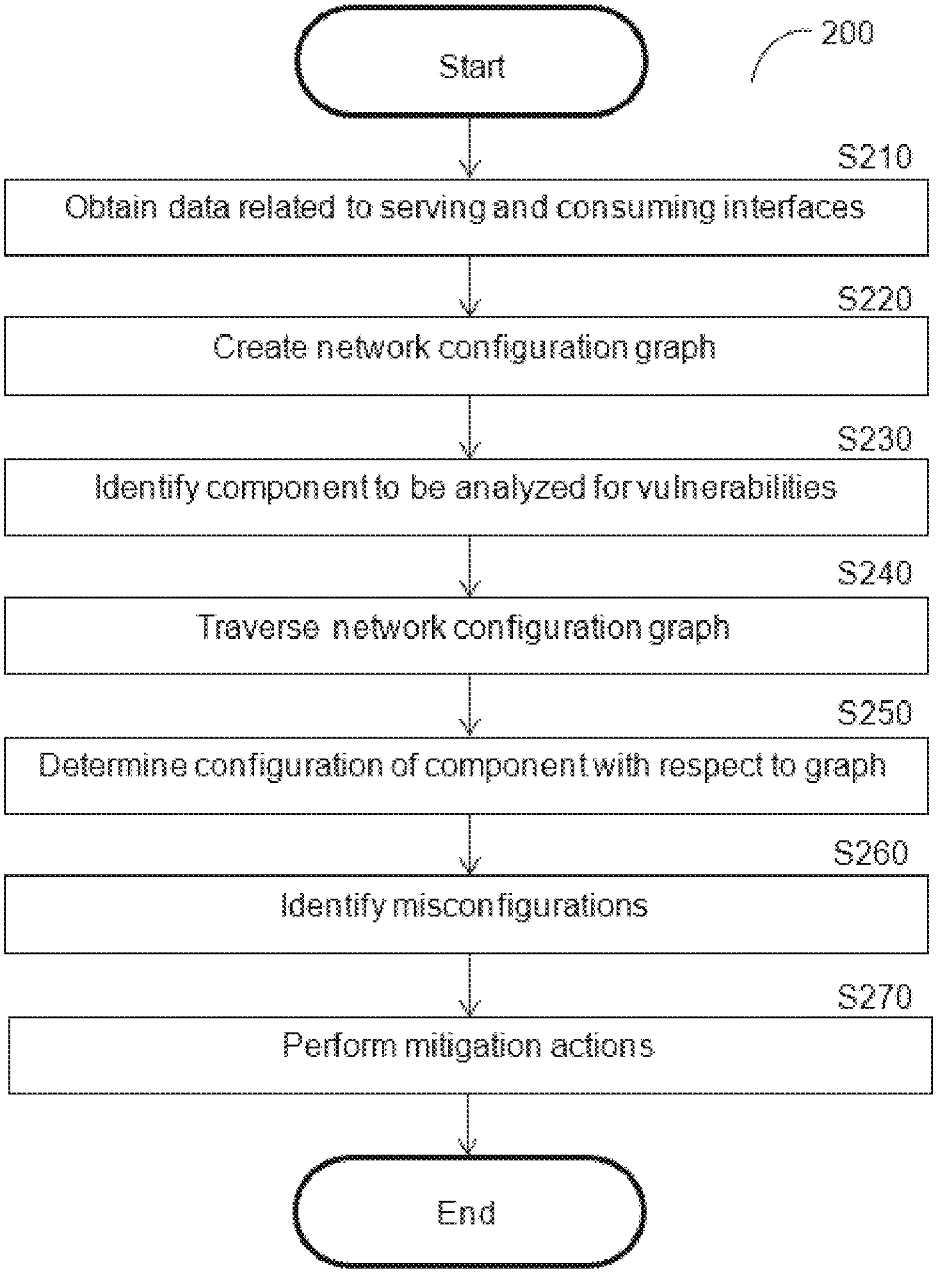
FIG. 2 is a flowchart illustrating a method for securing a computing environment using a network configuration graph according to an embodiment.

FIG. 2 is a flowchart 200 illustrating a method for securing a computing environment using a network configuration graph according to an embodiment. In an embodiment, the method is performed by the network configuration analyzer 130, FIG. 1.

At S210, data related at least to serving and consuming computing interfaces is obtained. The data may be obtained by, for example, retrieving such data from systems deployed in a computing environment, tools communicating with systems deployed in the computing environment, both, and the like. More specifically, the data may include metadata collected by engines monitoring for communications related to service and consumption of computing interfaces which may be indicative of connections between computing interfaces and other components within a computing environment as well as any connections between those other components. Such data may include, but is not limited to, access logs, traffic or portions thereof, both, and the like.

In an embodiment, S210 may include accessing a computing environment in which computing interfaces are served and consumed. To this end, predetermined credentials (e.g., read-only credentials provided by an operator of a cloud environment) may be utilized to access the computing environment, and data related to serving and consuming computing interfaces may be fetched from the computing environment.

In a further embodiment, obtaining the data may include duplicating traffic within the computing environment. The duplicated traffic may be analyzed in order to determine information about how, for example, computing interfaces are consumed in the computing environment. An example method for duplicating traffic which may be utilized in accordance with the disclosed embodiments is described in U.S. patent application Ser. No. 17/154,764, assigned to the common assignee, the contents of which are hereby incorporated by reference.

At S220, a network configuration graph is created. In an embodiment, the network configuration graph includes a mapping between computing interfaces and other components in a computing environment. More specifically, the network configuration graph at least includes nodes representing computing interfaces and nodes representing infrastructure components of the computing environment, thereby allowing for representing the potential interactions between the computing interfaces and the infrastructure of the computing environment.

In an embodiment, S220 includes extracting metadata related to serving and consuming computing interfaces as well as inspecting that metadata in order to identify connections to and from computing interfaces in order to graph connections between components of a computing environment which may relate to the service and/or consumption of computing interfaces. As noted above, this allows for unearthing indirect or otherwise hidden connections to computing interfaces, which in turn can be utilized to improve analysis of the configuration of components in the computing environment with respect to computing interface-related policies.

Figure 3:
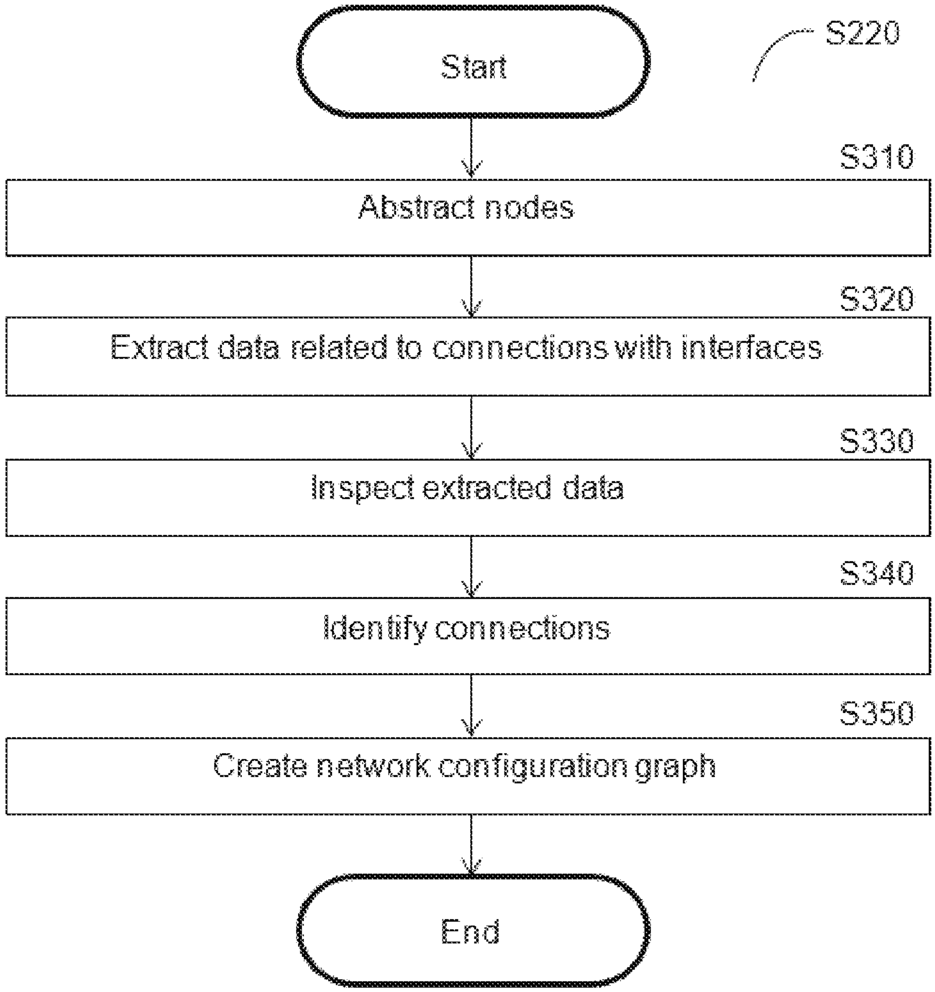
FIG. 3 is a flowchart illustrating a method for creating a network configuration graph based on computing interfaces according to an embodiment.

In an embodiment, the network configuration graph is created as now described with respect to FIG. 3. FIG. 3 is a flowchart S220 illustrating a method for creating a network configuration graph based on computing interfaces according to an embodiment.

At S310, nodes of a computing environment are abstracted into component types. In an embodiment, the abstracted nodes include at least nodes representing components which are related to serving computing interfaces, consuming computing interfaces, or both. Such computing interface-related nodes may represent components such as, but not limited to, computing interfaces, cloud compute systems, virtual machines, network identifiers (e.g., uniform resource locators), networks, devices which manage traffic related to serving or computing interfaces (e.g., load balancers), software application services, application gateways, combinations thereof, and the like.

In a further embodiment, the abstracted nodes only include such computing interface-related nodes. Including only computing interface-related nodes in the network configuration graph reduces subsequent processing needed to traverse the graph when applying misconfiguration detection rules defined only with respect to service or consumption of computing interfaces.

In an embodiment, S310 includes applying a dictionary mapping specific types of components to abstractions defined with respect to characteristics of the components reflected in data related to communications with those components. In a further embodiment, the dictionary defines abstractions such that components which serve and/or consume computing interfaces similarly are abstracted into the same type of component regardless of whether those components are normally considered to be the same type of component for other purposes. In other words, the dictionary defines the abstractions at least partially with respect to how the components serve or consume computing interfaces. In this regard, it is noted that different kinds of components may serve or consume computing interfaces similarly such that their interactions with computing interfaces are comparable for purposes of detecting misconfigurations.

As a non-limiting example for different components being abstracted with respect to service or consumption of computing interfaces, virtual machines and cloud compute systems like Elastic Cloud Compute (EC2) serve APIs in a comparable manner and, consequently, the dictionary may be predefined with respect to features of virtual machines and cloud compute systems such that both of these components are abstracted into the same type. As another non-limiting example, Lambdas and API gateways may be abstracted into the same type of component.

At S320, data related to connections with computing interfaces is extracted from a computing environment including the components represented by the abstracted nodes. Such data may include, but is not limited to, data utilized to connect between components such as identifiers of components to connect to and any required authentication data. As a non-limiting example, data from an API engine may include information needed to connect between an API and a particular component on the edge of a cloud environment.

At S330, the extracted data is inspected in order to identify the portions of the data to be used for connecting to components within the computing environment. In an embodiment, S330 includes applying inspection rules defining portions of the data to be identified. As a non-limiting example, for an API that executes Lambda, the inspection rules may include rules for searching data from an API engine for a specific field identifying a component in the computing environment. Further, the data in the field found during the search may be compared to data available for components in the computing environment to determine whether there is a matching component which may be connected to.

At S340, connections between components in the computing environment are identified. The connections at least include connections between computing interfaces and other components (e.g., computing infrastructure components) deployed in the computing environment. The connections may further include connections between components which communicate directly with computing interfaces and components which may not communicate directly with computing interfaces.

In an embodiment, S340 includes attempting to connect to one or more other components using data related to one of the components. In a further embodiment, the data found during the inspection used for connecting to other components is utilized to identify and attempt to connect to those other components. If a connection is established this way, the connection may be identified.

In another embodiment, S340 includes identifying or creating an identifier for each component and identifying connections with respect to these identifiers. The identified or created identifiers are associated with respective abstracted nodes such that these identifiers effectively represent specific instances of the types of components demonstrated by the abstraction for purposes of mapping between specific components based on their abstracted types.

As a non-limiting example for a connection between a computing interface and another component, a particular computing interface may be served by a particular device represented by an Internet Protocol (IP) address, each of which is represented by one of the abstracted nodes. The serving of the API by the device having that IP address may be identified as a connection to be mapped. As a non-limiting example of such a connection between other components, a load balancer may direct traffic to two different machines, where each of the load balancer and the machines is represented by one of the abstracted nodes. A connection from the load balancer to each of the machines is identified as connections to be mapped.

At S350, the network configuration graph is created based on the abstracted nodes and the identified connections. The network configuration graph includes a mapping between the abstracted nodes determined based on the identified connections such that the network configuration graph effectively represents how the computing interfaces are served and consumed, and any related communications before or after service or consumption of computing interfaces which may be indicative of potential misconfigurations. To this end, the network configuration graph at least includes the abstracted nodes and edges representing the identified connections between the abstracted nodes.

In some embodiments, the network configuration graph may include links or other pointers to locations for the respective components represented by nodes in the network configuration graph. These pointers may allow for convenient access to such components, for example, to a user viewing the network configuration graph who spots a potential misconfiguration. The pointers may be realized as single click elements which launch appropriate systems for viewing information related to the respective components when they are interacted with as part of an exploration tool with respect to computing-interface related components in the computing environment.

Returning to FIG. 2, at S230, a component to be analyzed for potential vulnerabilities is identified. The component may be identified in a request (e.g., by an identifier included in a request received from a device such as the admin device 150, FIG. 1), may be one of the components in a computing environment selected for a security analysis. The component may be, but is not limited to, a computing interface.

At S240, the network configuration graph is traversed with respect to the component identified at S230. In an embodiment, S240 includes querying the knowledge graph using an identifier of the component to be analyzed or otherwise using a query generated based on information about the component to be analyzed.

At S250, one or more configurations of the component are determined with respect to the network configuration graph. As noted above, because the network configuration graph includes connections between and among computing interfaces, infrastructure components, and other components deployed within the computing environment, traversing the network configuration graph starting at a particular component allows for unearthing contextual information about how computing interfaces are served or consumed with respect to that component. This, in turn, makes the network configuration graph serve as a demonstration of various ways in which computing interfaces can be consumed or served and the accompanying configurations demonstrates by the ways in which computing interfaces are consumed and served.

At S260, one or more misconfigurations in the component are identified. The misconfigurations may be identified, for example, by applying one or more misconfiguration rules which define improper misconfigurations. More specifically, such misconfiguration rules may be defined with respect to potential connections between abstracted interface-related nodes in the knowledge graph such that the connections in the knowledge graph may be compared to known misconfigurations defined by the misconfiguration rules in order to identify misconfigurations based on matches between the actual configurations and the known misconfigurations.

In an embodiment, S260 includes comparing the configurations determined at S250 to one or more policies which define correct or incorrect configurations for either specific computing interfaces, certain types of computing interfaces, computing interfaces deployed in certain ways, or otherwise with respect to applicable kinds of computing interfaces.

As noted above, mapping connections based on communications involving computing interfaces in a network configuration graph and traversing that network configuration graph in order to determine configurations allows for automating misconfiguration detection related to computing interfaces. More specifically, misconfiguration detection rules can be defined with respect to nodes defined in the network configuration graph and the connections between those nodes, thereby allowing for automatically detecting misconfigurations. Further, abstracting the interface-related nodes to be used in the network configuration graph as discussed above allows for defining broader kinds of potentially interface-related components, which in turn allows for defining the misconfiguration detection rules such that they are not limited to particular nodes or computing interfaces.

At S270, one or more mitigation actions are performed with respect to the detected misconfigurations. The mitigation actions may include, but are not limited to, blocking traffic to and from misconfigured computing interfaces, reconfiguring the misconfigured computing interfaces (e.g., by changing a configuration that does not require authentication to a configuration that does require authentication or by placing a web application firewall configuration in front of an API server), generating a notification including a recommendation to reconfigure the component using the misconfigured computing interface, combinations thereof, and the like.

Figure 4:
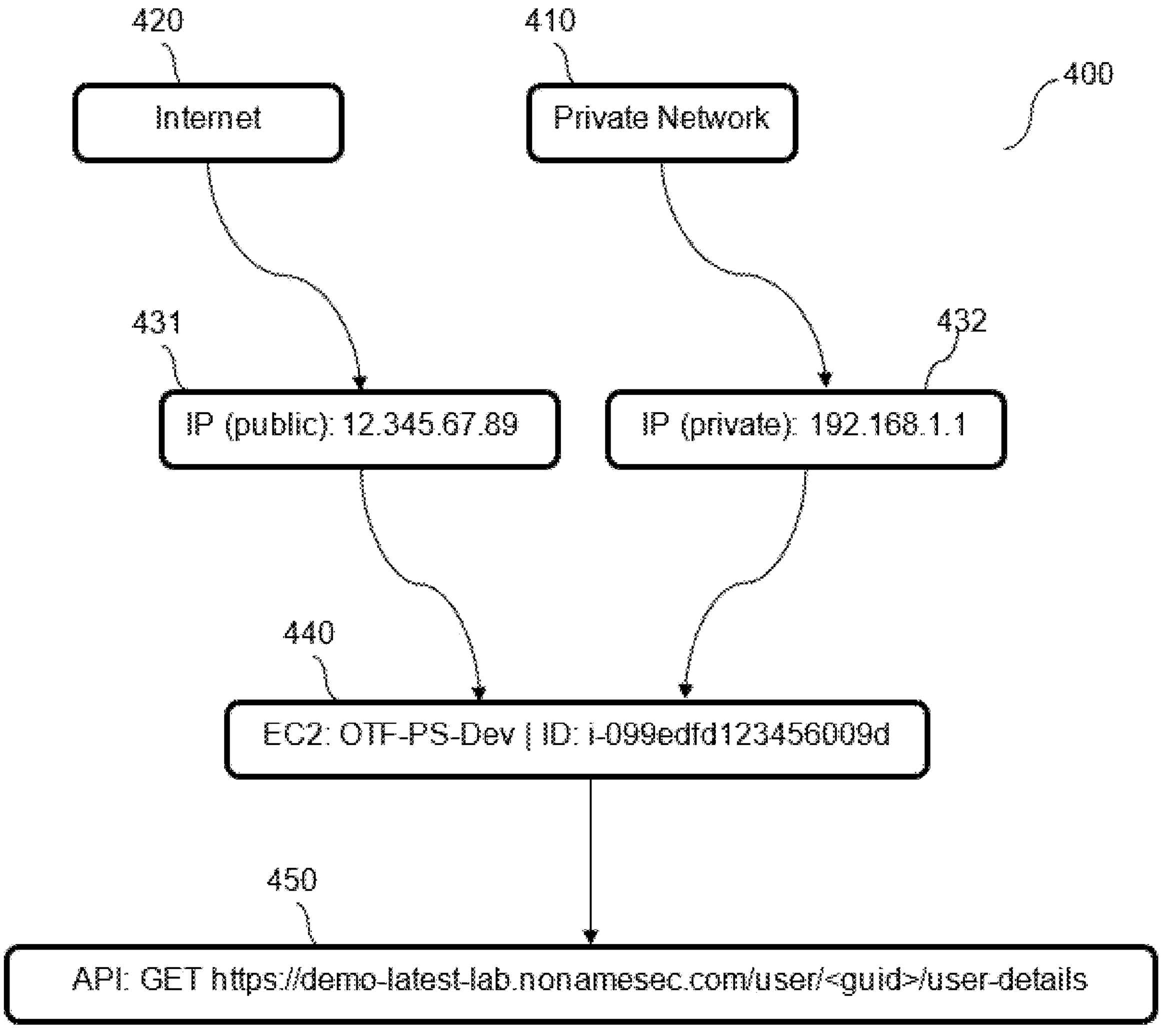
FIG. 4 is an example illustration of a network configuration graph.

It should be noted that the process of creating the network configuration graph as discussed with respect to FIG. 3 and the process of using the network configuration graph in order to identify and mitigate misconfigurations are depicted as a single flow performed by one system (e.g., the network configuration analyzer 130) merely for simplicity purposes, and that the disclosed embodiments are not limited to such an implementation. The method for creating the network configuration graph may be distinct from the steps for traversing and identifying misconfigurations using the network configuration graph, and may be performed by FIG. 4 is an example illustration of a network configuration graph 400. In the example shown in FIG. 4, the network configuration graph 400 includes various nodes 410 through 450 representing respective components such that the network configuration graph 400 illustrates flow between and among those components and, in particular, a flow that includes interaction with an application programming interface (API) represented by the computing interface node 450.

More specifically, the network configuration graph includes a network node 410, an Internet node 420, a public IP address node 431, a private IP address node 432, a cloud compute node 440, and a computing interface node 450. The network configuration graph 400 further includes arrows representing interactions between these nodes which collectively form the flow through a network infrastructure going through one or more computing interfaces.

As depicted in FIG. 4, a device may communicate via a network interface at the IP address represented by the public IP address node 431 and via a network interface at the IP address represented by the private IP address node 432. In that case, the device communicating via network interfaces at these IP addresses is exposed to a private network represented by the network node 410 and to the Internet represented by the node 420. That device therefore exposes an elastic cloud compute (EC2) system represented by the compute node 440 to these networks. The device serves the API represented by the computing interface node 450. In the illustration shown in FIG. 4, the node 440 is directly connected to the node 450, i.e., without communicating through a component represented by another node. The node 450 may be said to be indirectly connected to any of the nodes 410, 420, 431, and 432, through the node 440.

The network configuration graph 400 can be traversed in order to identify connections between and among these components in order to identify misconfigurations related to improper service or consumption of a computing interface as described herein. As a non-limiting example, when misconfiguration detection rules for the API "otf-ps-website/otf/getDetails.en_us.json" (i.e., the API represented by the computing interface node 450) indicate that the API should not be exposed to the Internet either directly or indirectly, traversing the network configuration graph 400 would yield a misconfiguration due to the flow going from the Internet node 420 through the IP address node 431 to the computing interface node 450.

Figure 5:
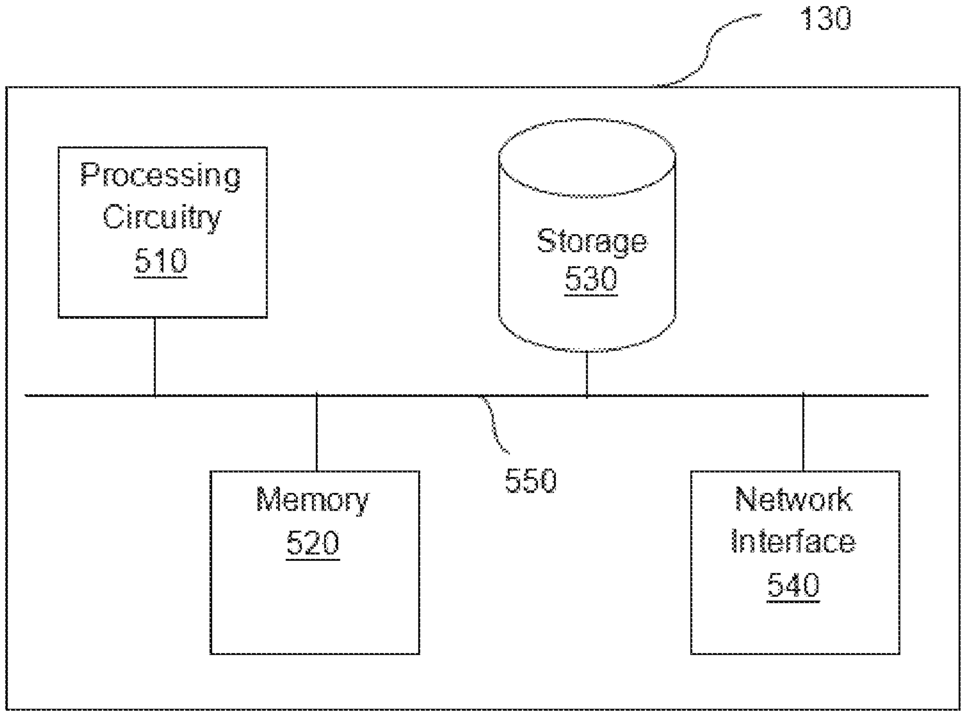
FIG. 5 is a schematic diagram of a network configuration analyzer according to an embodiment.

FIG. 5 is an example schematic diagram of a network configuration analyzer 130 according to an embodiment. The network configuration analyzer 130 includes a processing circuitry 510 coupled to a memory 520, a storage 530, and a network interface 540. In an embodiment, the components of the network configuration analyzer 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the network configuration analyzer 130 to communicate with, for example, the internal services 120, the admin device 150, both, and the like.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing a network infrastructure of a computing environment, comprising:

creating a network configuration graph by abstracting nodes of the network infrastructure representing components that are associated with serving or consuming one or more computing interfaces;

responsive to receipt of a query associated with a given component, traversing the network configuration graph to identify one or more flows involving the given component and related to the service or consumption of the one or more computing interfaces;

based on traversing the network configuration graph, detecting a configuration of the given component related to service or consumption of the one or more computing interfaces; and performing an action with respect to the detected configuration.

2. The method as described in claim 1, wherein the configuration is a misconfiguration, and the action is a mitigation action.

3. The method as described in claim 1, wherein the components are computing interface-related components that serve, consume, or interact with the one or more computing interfaces.

4. The method as described in claim 1, wherein at least one computing interface is an Application Programming Interface (API).

5. The method as described in claim 1, wherein the action includes issuing a notification.

6. The method as described in claim 1, wherein the detected configuration is associated with a vulnerability.

7. The method as described in claim 1, wherein the network configuration graph includes first nodes representing the one or more computing interfaces, and second nodes representing infrastructure components of the computing environment.

8. The method as described in claim 1, wherein the network configuration graph exposes at least one indirect or hidden connection from the given component to the one or more computing interfaces.

9. The method as described in claim 1, wherein abstracted nodes of the network configuration graph consist essentially of computing interface-related nodes.

* * * * *